April 19, 1966     T. I'ANSON     3,246,731
CHAIN CONVEYOR WITH WING CLEAT
Filed Nov. 25, 1964
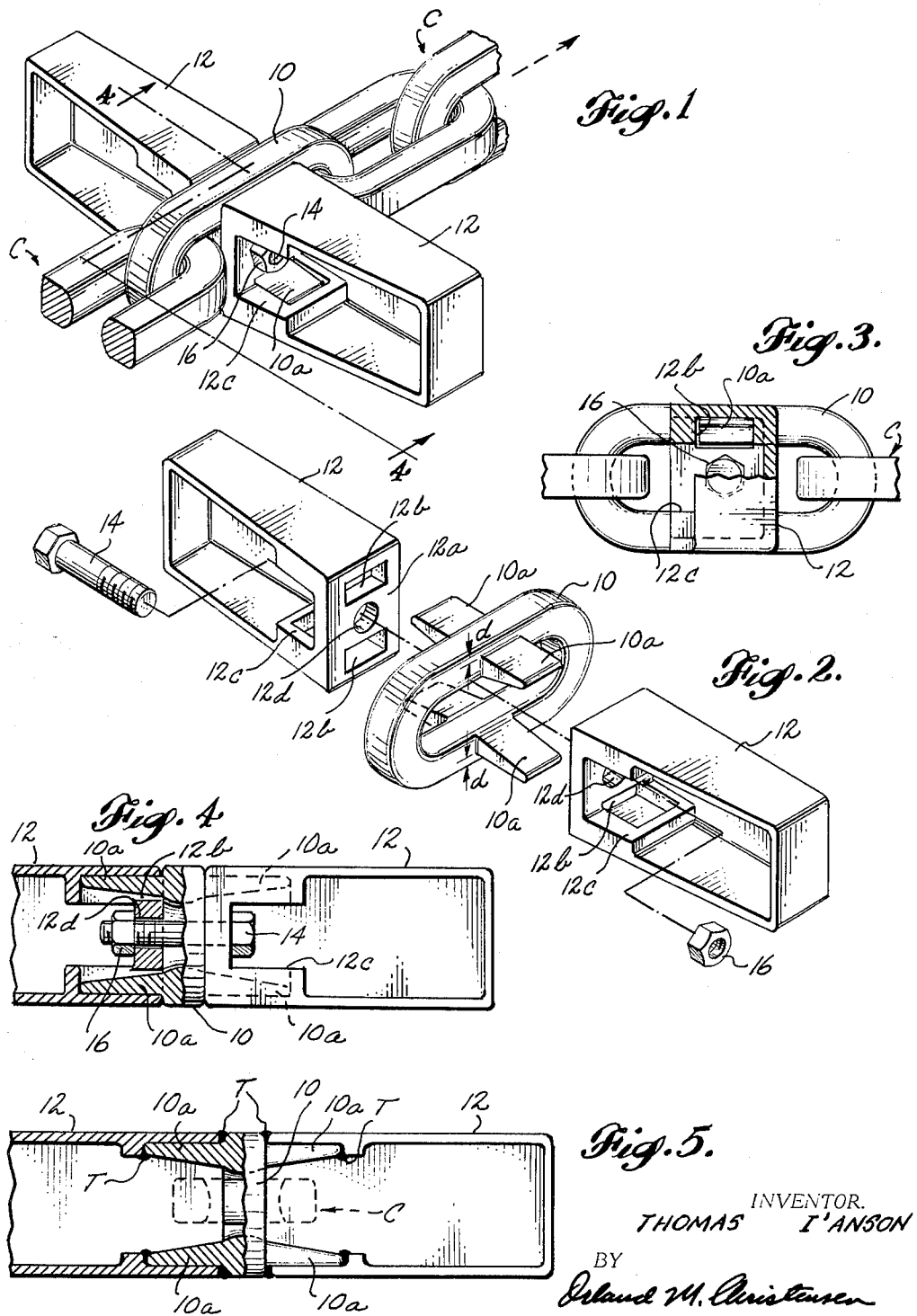
INVENTOR.
THOMAS I'ANSON
BY
Orland M. Christensen
ATTORNEY

United States Patent Office 3,246,731
Patented Apr. 19, 1966

3,246,731
CHAIN CONVEYOR WITH WING CLEAT
Thomas l'Anson, Bellevue, Wash., assignor to l'Anson Industries, Inc., Seattle, Wash., a corporation of Washington
Filed Nov. 25, 1964, Ser. No. 413,750
9 Claims. (Cl. 198—176)

This invention relates to improvements in chain conveyors of the type in which one or more chain links have transverse cleat-forming wings mounted thereon, such as are used in plywood mills, lumber mills, etc. The wings, moving along the surface of a chute or the like, engage and advance materials, such as sawdust, scraps, panels, etc. A broad object hereof is to devise an improved means for mounting the cleat wings on a conveyor chain link while permitting that link to be cast with its neighbors in the manufacture of interlinked conveyor chain of any desired length by known casting methods. The invention is herein illustratively described by reference to the presently preferred embodiment thereof; however, it will be recognized that certain modifications and changes therein with respect to details may be made without departing from the essential features involved, as set forth in the claims.

In the manufacture of flight conveyors by foundry methods it is desirable for reasons of economy as well as ultimate conveyor chain strength that the links which carry the cleats be of unitary construction, as strong as the other links, and all conveniently castable in interlinked relation, in accordance with the method used for the other links of the chain, and in the same operation. The cleats would commonly be too long to be cast integrally, but are made separately and applied later. It is desirable that such separate cleats be locked in position so that they will not shift lengthwise of the link, nor turn or twist with respect to the links that carry them, out of their normal position thereon. The cleat-carrying links in use are disposed uprightly, with the cleats extending laterally from each side, and this orientation will be assumed in this specification.

In accordance with this invention, the cleat carrier link and associated cleat wings mounted thereon in use are formed with transversely projecting stubs on the link, and with the cleat having complementally formed and closely fitting stub-receiving recesses or sockets. By interengagement of these stubs and recesses the desired positioning of the cleats is maintained, and principal load forces are transmitted to the chain link through the stubs and the side surfaces of the links, without reliance for strength upon a securing bolt or other means used to couple the cleat wings to the link. Whether the cleat wings be secured in place upon the link by a fastening bolt or by welding or other means, such a means functions primarily only to maintain interengagement between the projecting stubs on the link and the complemental socket-forming members in the wings which receive the stubs, whereby bending stresses, transverse or longitudinal displacement forces, or torques about any of different axes, are resisted efficiently and are assumed directly and primarily by the body of the link, and not by such fastening means.

Whether shell-casting methods or other foundry techniques are used for casting the chain, the wing carrier links are as easily cast as the neighboring links, inasmuch as the provision of the relatively short projecting wing-supporting stubs on opposite sides of the link shanks are readily included in the form of the molds, and it is not necessary to use separate molding techniques nor to incorporate separately cast links in the otherwise completed chain by welding or other techniques, as in most prior devices. All chain links, including the wing carrier links, are cast in the same operation. Furthermore, when the securement of the cleat wings to the link is by means of a bolt or the like, individual wings may be replaced readily, as desired, in order to repair damage or change the size or style of the wings. In the case of extreme loading and vibration conditions welding of the cleat wings to the link, either in lieu of or in conjunction with retention by a bolt, provides added assurance that the parts will not become loosened.

These and other features, objects and advantages of the invention will become more fully evident from the following description thereof, and by reference to the accompanying drawings, and to the claims.

FIGURE 1 is an isometric view of a few links of chain, one of which has the cleat wings mounted thereon.

FIGURE 2 is a view similar to FIGURE 1, of the special link alone, with the parts disassembled and the adjacent links of the chain omitted.

FIGURE 3 is a side view of the cleat carrier link, with portions of the cleat wing broken away to show details.

FIGURE 4 is a transverse sectional view taken on line 4—4 in FIGURE 1.

FIGURE 5 is a view similar to FIGURE 4, showing a modification in which the cleat wings and carrier link are joined by welding, and the retaining bolt is omitted.

Referring to FIGURES 1 to 4 inclusive, upright carrier link 10 of chain C preferably has the uninterrupted form and the size of neighboring links, closed at both ends, and with upper and lower shanks, with the exception that the carrier link has two oppositely projecting pairs of stubs 10a mounted on the side faces of the link shanks approximately midway between the ends of the link. These stubs 10a are cast integrally with the chain link, and the link is cast in situ, i.e. interlinked with its neighbors according to readily available foundry methods. Each stub 10a has a width measured lengthwise of the link which is a fraction of the length of such link, and has a thickness at the root, measured transversely of the link, which is less than the thickness of the link's shanks, with the lower or inner face of the upper stub and the upper or inner face of the lower stub arranged substantially flush at the root with the respective inside faces of the shanks or legs of the carrier link. The opposite or outer faces of the stubs, however, are offset inwardly from the outer surface or face of the carrier link by a distance $d$ (FIGURE 2) which makes possible coplanar relationship between the top and bottom surfaces of the carrier link and the top and bottom surfaces of the cleat wings 12 when mounted thereon, as can be seen in FIGURES 1, 4 and 5.

Engageable with the stubs 10a on each side of the carrier link 10 are the respective cleat wings 12, which are shown as of hollow or box girder construction, and they may be of any length or configuration within the requirements of the functions to be performed by them in a given conveyor installation. They are shown as slightly tapering in a given plan elevation, but their particular form is not of the essence of this invention. For present purposes the essential features of the cleat wings reside in the elements thereon which receive and engage the projecting stubs 10a, so as to maintain the cleat wings in rigid relationship with the carrier link 10 when the parts are assembled.

To that end the inside wall 12a of each cleat wing has upper and lower recesses or apertures 12b therein, preferably rectangular, but in any event corresponding to the shape of the stubs 10a at their root ends, and of a size which snugly accommodates the respective upper and lower stubs on the carrier link. These apertures lead into box cavities or recesses formed in the casting of the cleat wing by the wall formation 12c at opposite sides and at the inner end of the cavity space that accommodates the stub. Thus, when the cleat wing on one side of the carrier link is inserted into position, with the paired stubs passing through the respective apertures 12b, and the wall 12a brought into physical abutment with the side of the shanks of the carrier link, the projecting end or tip of each stub engages the inner or transverse portion of the wall formation 12c, whereas the front and rear edges, or shoulders, of the stub engage the side portions of such wall formation, which constitute complemental shoulders. The top surface of the upper stub and the bottom surface of the bottom stub are in contact with the inside top and bottom walls, respectively, of the cleat wing. In order to draw and retain the cleat wings into such position of interengagement with the carrier link, the walls 12a are apertured centrally at 12d and a fastening bolt 14 is passed through the aligned apertures and the opening between the shanks of the carrier link, and a nut 16 is applied and tightened on the threaded end of the bolt.

As will appear from the interengaged components depicted in FIGURES 1, 3 and 4, the interfitted carrier link stubs and cleat wing retaining pockets maintain rigid physical relationship of the cleat wings and the carrier link substantially independently of the connecting bolt 14. The latter's principal purpose is to hold the parts together in such positional relationship that the load forces being transferred between the carrier link and the cleat components are transferred through the stubs 10a and not through the connecting bolt.

In the embodiment shown in FIGURE 5 the connecting bolt is omitted and the parts are tack-welded at the locations T. Again, the welding is not required to assume a major load-bearing function, but only to maintain the parts in the described relationship, wherein load transmission between parts occurs primarily through the medium of the interengaged link stubs and cleat wing socket walls, or shoulders, as described above.

These and other aspects of the invention will be evident to those skilled in the art based on the present disclosure of the preferred practice of this invention.

I claim as my invention:

1. A chain link incorporated in an interlinked chain conveyor or the like, said link comprising an endless loop including upper and lower shanks joined by rounded ends, stub means outstanding from and integral with each shank intermediate the ends of the link, said stub means being formed with at least two shoulders facing oppositely in the direction of the respective ends of the link, and cleat wings held seated against the opposite sides of the link's shanks, and each formed with shoulders complemental to and engaging the shoulders of the stub means, whereby forces in the direction of the length of the link are assumed by the interengaged shoulders.

2. A chain link as in claim 1, wherein the stub means stand out laterally from each side of each shank, and the seated end of each cleat wing is recessed to receive the corresponding stub means, and to define the shoulders complemental to the shoulders of the stub means.

3. A chain link as in claim 2, wherein each cleat wing is formed as a closed loop of generally rectangular form, the seating end of each wing loop being apertured at top and at bottom, complementally to and receiving closely the corresponding stub means of its supporting link.

4. A chain link as in claim 3, each cleat wing being formed with shoulders extending outwardly in continuation of the side margins of its apertures, and the complemental stub means being of a length to engage its edges closely with said shoulders.

5. A chain link as in claim 2, wherein the seating end of each cleat wing is apertured, intermediate the stub-receiving recesses, and a bolt passing through said apertures and through the center of the link, to retain the cleat wings in place upon the link.

6. A conveyor chain comprising a succession of similar links interlinked continuously, certain upright links at intervals in its length being formed with integral stubs outstanding laterally from the upper and the lower shanks of such link, each stub of generally rectangular cross section, a cleat wing seated against the upper and lower shanks of said link, at each side, the seated end of each wing being recessed complementally to and receiving closely the corresponding stubs, to transmit forces in the direction of the chain between the wings and the wing-carrying links by interengagement of the stubs and their recesses.

7. A conveyor chain as in claim 6, wherein each cleat wing is of generally rectangular looped form, its wall at its seated end being apertured to define recesses for reception of the stubs.

8. A conveyor chain as in claim 7, wherein each cleat wing, internally of its looped form and at its seated end, is formed with a recess the walls whereof are continuous with the walls of the apertures, and define upstanding shoulders with which the edges of the stub engage.

9. A conveyor chain, as in claim 6, wherein the stubs are offset by a given distance below the upper and above the lower edges of the stub-carrying link, the cleat wings being apertured to receive closely said stubs, and being of a thickness above and below said stubs, respectively, corresponding to such given distance, so as to lie flush with the upper and the lower edges of such link.

References Cited by the Examiner
UNITED STATES PATENTS

| | | | |
|---|---|---|---|
| 1,681,429 | 8/1928 | Pangborn | 198—176 |
| 2,269,056 | 1/1942 | Guest | 198—176 |
| 2,278,853 | 4/1942 | Hudson | 198—176 |

SAMUEL F. COLEMAN, *Primary Examiner.*